US012306641B2

(12) United States Patent
Tankersley

(10) Patent No.: US 12,306,641 B2
(45) Date of Patent: May 20, 2025

(54) AUTONOMOUS TRACKING BASED ON RADIUS

(71) Applicant: Skydio, Inc., San Mateo, CA (US)

(72) Inventor: Benjamin Tankersley, San Mateo, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 18/600,040

(22) Filed: Mar. 8, 2024

(65) Prior Publication Data
US 2024/0345585 A1   Oct. 17, 2024

Related U.S. Application Data

(63) Continuation of application No. 17/824,252, filed on May 25, 2022, now Pat. No. 11,934,207, which is a
(Continued)

(51) Int. Cl.
| G05D 1/00 | (2024.01) |
|---|---|
| G05D 1/46 | (2024.01) |
| G05D 1/683 | (2024.01) |
| G05D 1/686 | (2024.01) |
| G05D 1/689 | (2024.01) |
| H04N 7/18 | (2006.01) |
| H04N 23/695 | (2023.01) |
| B64U 10/14 | (2023.01) |
| B64U 20/87 | (2023.01) |
| B64U 30/20 | (2023.01) |

(Continued)

(52) U.S. Cl.
CPC ........... *G05D 1/101* (2013.01); *G05D 1/0094* (2013.01); *G05D 1/12* (2013.01); *G05D 1/46* (2024.01); *G05D 1/683* (2024.01); *G05D 1/686* (2024.01); *G05D 1/689* (2024.01); *H04N 7/185* (2013.01); *H04N 23/695* (2023.01); *B64U 10/14* (2023.01); *B64U 20/87* (2023.01); *B64U 30/20* (2023.01); *B64U 50/19* (2023.01); *B64U 2101/30* (2023.01); *B64U 2201/10* (2023.01); *B64U 2201/20* (2023.01)

(58) Field of Classification Search
None
See application file for complete search history.

(56) References Cited

U.S. PATENT DOCUMENTS

| 1,003,392 A | 9/1911 | Blackmond |
| 5,313,201 A * | 5/1994 | Ryan .................. G08G 5/55 340/961 |

(Continued)

*Primary Examiner* — Jonathan M Dager
(74) *Attorney, Agent, or Firm* — Young Basile Hanlon & MacFarlane, P.C.

(57) ABSTRACT

Disclosed is a configuration of an autonomous vehicle for autonomously following a moving subject based on a radius of a virtual sphere surrounding the autonomous vehicle. The autonomous vehicle may be an unmanned ground vehicle or an unmanned aerial vehicle, which autonomously follows the subject (e.g., a device, a live entity, or any object) based on the virtual sphere. The radius of the virtual sphere may be dynamically configured according to a velocity of the autonomous vehicle or configurations of a camera coupled to the autonomous vehicle. Accordingly, the autonomous vehicle can follow the subject along a smooth trajectory, and capture images of abrupt movements of the subject in a cinematically pleasing manner.

20 Claims, 10 Drawing Sheets

Related U.S. Application Data continuation of application No. 16/889,216, filed on Jun. 1, 2020, now Pat. No. 11,372,429, which is a continuation of application No. 16/397,187, filed on Apr. 29, 2019, now Pat. No. 10,671,096, which is a continuation of application No. 15/445,464, filed on Feb. 28, 2017, now Pat. No. 10,317,915.

(51) Int. Cl.
*B64U 50/19* (2023.01)
*B64U 101/30* (2023.01)

(56) References Cited

U.S. PATENT DOCUMENTS

| | | | | |
|---|---|---|---|---|
| 5,872,526 | A * | 2/1999 | Tognazzini | G08G 5/0008 340/961 |
| 6,804,607 | B1 * | 10/2004 | Wood | G05D 1/1062 340/425.5 |
| 9,405,005 | B1 * | 8/2016 | Arteaga | G08G 5/0013 |
| 9,417,325 | B1 * | 8/2016 | Bry | G08G 5/80 |
| 9,630,714 | B1 * | 4/2017 | Gohl | H04N 23/51 |
| 9,663,227 | B1 * | 5/2017 | Lema | G05D 1/0016 |
| 9,769,387 | B1 * | 9/2017 | Beard | G06V 20/17 |
| 9,792,709 | B1 * | 10/2017 | Meler | G06T 11/60 |
| 9,810,789 | B2 * | 11/2017 | Levien | G08G 5/26 |
| 9,896,202 | B2 * | 2/2018 | Jourdan | G05D 1/0088 |
| 10,033,928 | B1 * | 7/2018 | Meler | H04N 23/698 |
| 10,317,915 | B2 | 6/2019 | Tankersley | |
| 10,671,096 | B2 | 6/2020 | Tankersley | |
| 10,706,634 | B1 * | 7/2020 | Baumbach | H04W 4/021 |
| 11,094,077 | B2 * | 8/2021 | Lindsay | G06V 20/17 |
| 11,210,958 | B2 * | 12/2021 | Ophir | G08G 5/80 |
| 11,372,429 | B2 | 6/2022 | Tankersley | |
| 11,934,207 | B2 | 3/2024 | Tankersley | |
| 2003/0122701 | A1 * | 7/2003 | Tran | G01S 13/933 342/36 |
| 2008/0027647 | A1 * | 1/2008 | Ansell | G01S 13/933 701/301 |
| 2008/0140267 | A1 * | 6/2008 | Matuska | G05D 1/0858 701/3 |
| 2010/0250022 | A1 * | 9/2010 | Hines | G05D 1/0094 701/2 |
| 2010/0332136 | A1 * | 12/2010 | Duggan | G08G 5/80 701/301 |
| 2012/0089274 | A1 * | 4/2012 | Lee | G05D 1/0044 701/2 |
| 2012/0092208 | A1 * | 4/2012 | LeMire | G01S 13/87 342/29 |
| 2012/0143482 | A1 * | 6/2012 | Goossen | G08G 5/0034 701/120 |
| 2012/0209457 | A1 * | 8/2012 | Bushnell | G08G 5/53 701/4 |
| 2012/0287274 | A1 * | 11/2012 | Bevirt | H04N 7/185 348/E7.085 |
| 2012/0296497 | A1 * | 11/2012 | Lee | G05D 1/0202 701/3 |
| 2013/0124020 | A1 * | 5/2013 | Duggan | G05D 1/106 701/3 |
| 2013/0317669 | A1 * | 11/2013 | Jiang | G01S 3/00 701/3 |
| 2014/0231590 | A1 * | 8/2014 | Trowbridge | G08G 5/0039 244/175 |
| 2014/0249738 | A1 * | 9/2014 | Euteneuer | G08G 5/57 701/301 |
| 2014/0257595 | A1 * | 9/2014 | Tillmann | B64U 10/14 701/2 |
| 2014/0336848 | A1 * | 11/2014 | Saund | G06V 20/13 701/3 |
| 2015/0205301 | A1 * | 7/2015 | Gilmore | G05D 1/0094 701/11 |
| 2016/0018822 | A1 * | 1/2016 | Nevdahs | G05D 1/0094 701/26 |
| 2016/0127664 | A1 * | 5/2016 | Bruder | A63F 13/25 356/614 |
| 2016/0234438 | A1 * | 8/2016 | Satoh | H04N 23/667 |
| 2017/0038781 | A1 * | 2/2017 | Querejeta Masaveu | G08G 5/59 |
| 2017/0069214 | A1 * | 3/2017 | Dupray | G08G 5/55 |
| 2017/0084183 | A1 * | 3/2017 | Knox | G01S 13/867 |
| 2017/0161561 | A1 * | 6/2017 | Marty | H04N 23/90 |
| 2017/0193830 | A1 * | 7/2017 | Fragoso | G08G 5/55 |
| 2017/0225680 | A1 * | 8/2017 | Huang | B60T 8/17558 |
| 2017/0235316 | A1 * | 8/2017 | Shattil | H04W 4/40 701/3 |
| 2017/0244937 | A1 * | 8/2017 | Meier | H04N 23/66 |
| 2017/0334559 | A1 * | 11/2017 | Bouffard | G08G 5/55 |
| 2017/0372624 | A1 * | 12/2017 | Surcouf | G08G 5/045 |
| 2018/0107210 | A1 * | 4/2018 | Harnett | B63G 8/001 |
| 2018/0139374 | A1 * | 5/2018 | Yu | H04N 21/6587 |
| 2018/0189971 | A1 * | 7/2018 | Hildreth | G06T 7/13 |
| 2018/0194463 | A1 * | 7/2018 | Hasinski | B64U 30/20 |
| 2018/0204469 | A1 * | 7/2018 | Moster | G08G 5/0069 |
| 2018/0247421 | A1 * | 8/2018 | DeAngelis | H04N 23/695 |
| 2018/0284293 | A1 * | 10/2018 | Pan | G01S 19/45 |
| 2018/0356842 | A1 | 12/2018 | Tankersley | |
| 2019/0122568 | A1 * | 4/2019 | Nevdahs | G08G 5/55 |
| 2019/0174149 | A1 * | 6/2019 | Zhang | H04N 21/4728 |
| 2019/0310640 | A1 * | 10/2019 | Yokoi | H04N 23/695 |
| 2019/0317531 | A1 | 10/2019 | Tankersley | |
| 2020/0027230 | A1 * | 1/2020 | Zhao | G05D 1/106 |
| 2020/0302638 | A1 * | 9/2020 | Lindsay | G06T 7/246 |
| 2020/0387177 | A1 | 12/2020 | Tankersley | |
| 2021/0132612 | A1 * | 5/2021 | Wang | G08G 1/096791 |
| 2022/0291699 | A1 | 9/2022 | Tankersley | |

\* cited by examiner

AUTONOMOUS TRACKING BASED ON RADIUS

CROSS REFERENCE TO RELATED APPLICATION(S)

This application is a continuation of U.S. patent application Ser. No. 17/824,252, filed on May 25, 2022, which is a continuation of U.S. patent application Ser. No. 16/889,216, filed on Jun. 1, 2020, now U.S. Pat. No. 11,372,429, which is a continuation of U.S. patent application Ser. No. 16/397,187, filed on Apr. 29, 2019, now U.S. Pat. No. 10,671,096, which is a continuation of U.S. patent application Ser. No. 15/445,464, filed on Feb. 28, 2017, now U.S. Pat. No. 10,317,915, the contents of which are incorporated by reference herein in their entirety.

TECHNICAL FIELD

The disclosure generally relates to a system and a method of autonomously tracking a subject.

BACKGROUND

The proliferation of remote controlled vehicles and developments in image processing introduce new approaches in recording of images. For example, a remote controlled vehicle (e.g., ground vehicle or aerial vehicle) controlled by a user can follow a moving subject (e.g., a device, a live entity, or any object), while a camera mounted on or integrated with the remote controlled vehicle captures images of the moving subject. The use of the remote controlled vehicle allows an image of the moving object to be captured with a perspective view different from a perspective view of the user. However, relying on the user control to follow the moving subject is cumbersome, and is susceptible to losing track of the subject that suddenly may move in an unexpected direction.

SUMMARY

The present teachings provide a vehicle including a camera, a radius generator, and a vehicle controller interface. The radius generator is configured to: dynamically generate a virtual sphere that surrounds the vehicle, and dynamically determine a radius based on velocity data and camera configuration data. The vehicle controller interface configured to move the vehicle towards a target position.

The present teachings provide a method comprising: generating a virtual sphere; determining a radius of the virtual sphere, and controlling the vehicle. The generating a virtual sphere around a vehicle is performed with a radius generator. The method includes a step of determining a radius of the virtual sphere, with the radius generator, based upon velocity data of the vehicle and camera configuration data of a camera carried on the vehicle. The method includes a step of controlling the vehicle via a vehicle controller interface that moves the vehicle towards a target position.

The present teachings provide a method including: generating a target position, determining a radius of a virtual sphere, and controlling a vehicle. The method includes a step of generating a target position a vehicle is performed with a target position generator. The method includes a step of determining a radius of a virtual sphere surrounding the vehicle. The method includes a step of controlling the vehicle via a vehicle controller interface that moves the vehicle towards a target position.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
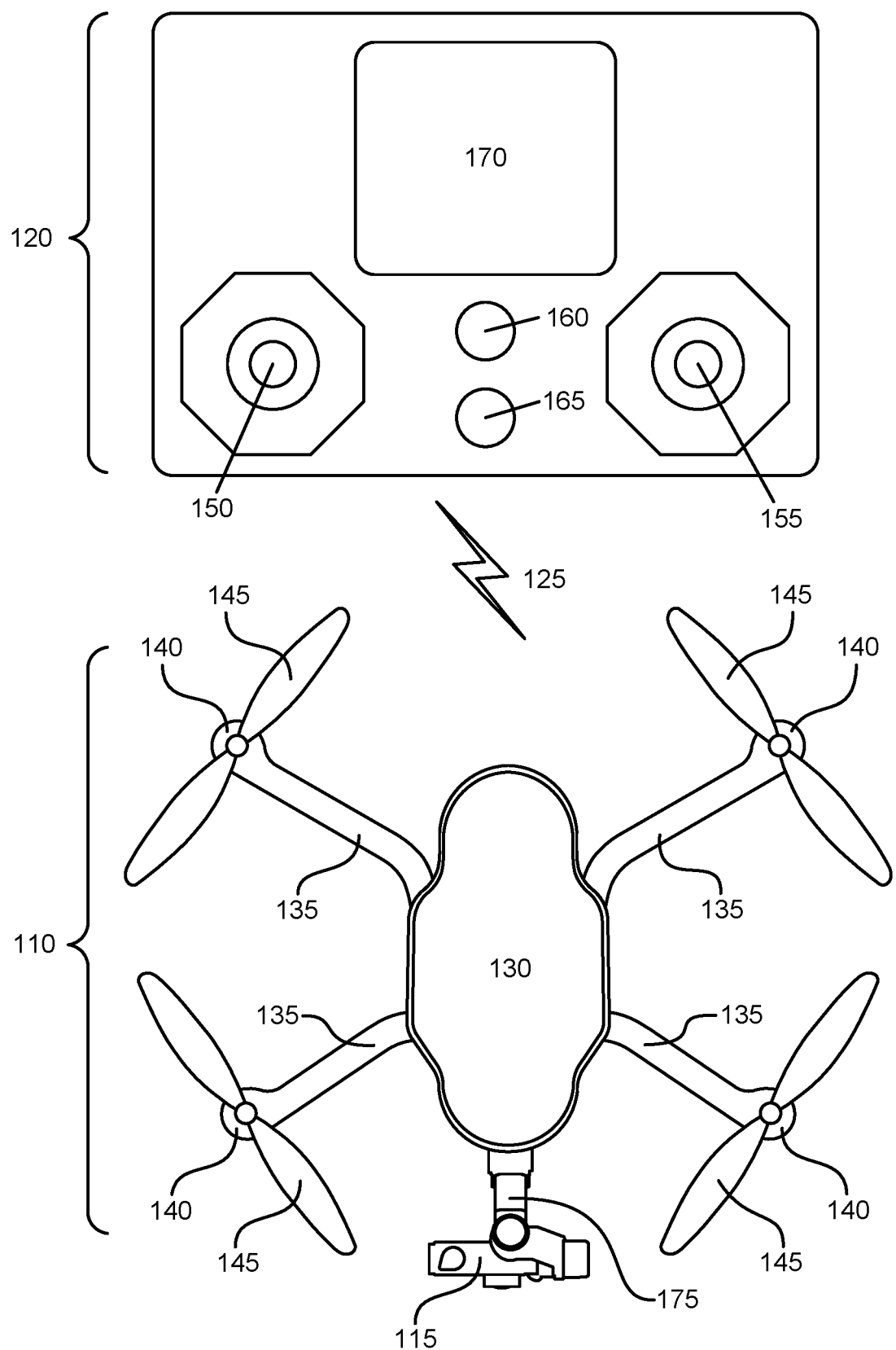
FIG. 1 illustrates an example configuration of a remote controlled aerial vehicle in communication with a remote controller, according to one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is an autonomous vehicle, on which a camera can be mounted, for autonomously following a moving subject based on a radius of a virtual sphere surrounding the autonomous vehicle. The autonomous vehicle may be an unmanned ground vehicle or an unmanned aerial vehicle, which autonomously follows the subject (e.g., a device, a live entity, or any object) based on the virtual sphere and captures an image of the moving subject. For ease of discussion, reference herein will be made to unmanned area vehicles, although the principles may apply to unmanned ground and/or water vehicles.

In one or more example embodiments, a flight plan including waypoints or target positions of the autonomous vehicle may be dynamically changed based on (i) a previous target position of the autonomous vehicle with respect to a position of the autonomous vehicle and (ii) a radius of the virtual sphere. The previous target position may be a previously determined waypoint or a previously determined target position of the autonomous vehicle. In one aspect, responsive to determining that the previous target position is located outside of the virtual sphere, the previous target position may be determined to be an updated target position of the autonomous vehicle (i.e., maintains the previous target position). Responsive to determining that the previous target position is located within the virtual sphere, an intersection between (i) the previous target position and a position of the subject and (ii) a surface of the virtual sphere may be determined to be the updated target position of the autonomous vehicle.

In one aspect, a virtual sphere may be dynamically configured. The autonomous vehicle may be located on a center of the virtual sphere. In one aspect, a radius of the virtual sphere may vary based on a velocity of the vehicle, configurations of the camera, or both. Example configurations of the camera include an orientation (e.g., pitch and heading), field of view, a frame rate, resolution, sensitivity to light according to International Standards Organization (ISO), white balance, aperture, exposure, etc. For example, the radius is increased as the velocity of the vehicle increases, or the radius may be decreased as the velocity of the vehicle decreases. For another example, the radius may be increased as a frame rate of the camera increases, and the radius is decreased as the frame rate decreases.

Advantageously, dynamically configuring the virtual sphere surrounding the autonomous vehicle and determining the updated target position of the autonomous vehicle according to the virtual sphere allow the autonomous vehicle to autonomously follow the subject moving in an unanticipated direction. Accordingly, the autonomous vehicle can follow the subject along a smooth trajectory, and capture images of abrupt movements of the subject in a cinematically pleasing manner.

Example Aerial Vehicle Configuration

FIG. 1 illustrates an example embodiment in which an aerial vehicle 110 is a quadcopter (i.e., a helicopter with four rotors). The aerial vehicle 110 in this example includes a housing 130 for payload (e.g., electronics, storage media, and/or camera), four arms 135, four rotors 140, and four propellers 145. Each arm 135 may mechanically couple with a rotor 140 to create a rotary assembly. When the rotary assembly is operational, all the propellers 145 may spin at appropriate speeds to allow the aerial vehicle 110 lift (take off), land, hover, move, and rotate in flight. Modulation of the power supplied to each of the rotors 140 may control the acceleration and torque on the aerial vehicle 110.

A gimbal 175 may be coupled to the housing 130 of the aerial vehicle 110 through a removable coupling mechanism that mates with a reciprocal mechanism on the aerial vehicle 110. The coupling between the gimbal 175 and the aerial vehicle 110 may have mechanical and communicative capabilities. In some embodiments, the gimbal 175 may be attached or removed from the aerial vehicle 110 without the use of tools. A camera 115 may be mechanically coupled to the gimbal 175, so that the gimbal 175 steadies and controls the orientation of the camera 115. It is noted that in alternate embodiments, the camera 115 and the gimbal 175 may be an integrated configuration.

The aerial vehicle 110 may communicate with a device via a wireless network 125. The device that communicates with the aerial vehicle 110 is described herein as being a remote controller 120. However, in alternate embodiments, the device may be any other computing device capable of wireless communicating (e.g., transmitting, receiving, or both) with the aerial vehicle 110. Some or all of the description attributed herein to the remote controller 120 may also be applied to other computing devices capable of wireless communication. Other computing devices may include a device with a screen that is used to display images or video captured by the aerial vehicle but not to control the aerial vehicle, such as, a laptop, smartphone, tablet, or head-mounted display.

In one embodiment, the wireless network 125 may be a long range Wi-Fi system. It also may include or be another wireless communication system, for example, one based on long term evolution (LTE), 3G, 4G, or 5G mobile communication standards. In some embodiments, the wireless network 125 may be a single channel and the aerial vehicle 110 and the remote controller 120 implement a half-duplex system. In an alternate embodiment, the wireless network 125 includes two channels: a unidirectional channel used for communication of control information from the remote controller 120 to the aerial vehicle 110 and a separate unidirectional channel used for video downlink from the aerial vehicle 110 to the remote controller 120 (or to another device, such as a video receiver where direct video connection may be desired). Alternate wireless network configurations may also be used.

The remote controller 120 in this example includes a first control panel 150, a second control panel 155, an ignition button 160, an auto-flight control button 165, and a screen (or display) 170. One primary purpose of the remote controller 120 is to facilitate movement of the aerial vehicle 110. To facilitate such movement, the remote controller 120 directs movement of a set point of the aerial vehicle 110. The set point of the aerial vehicle 110 is a mobile point in space that the aerial vehicle 110 attempts to reach through movement. The location, speed, and trajectory of the set point can be changed via instructions from a flight controller 315. When the aerial vehicle 110 reaches the set point, it hovers at that point until the location of the set point is changed via instructions from the flight controller 315. Following the change in location of the set point, the aerial vehicle 110 again moves towards the updated location of the set point. Thus movement of the set point of the aerial vehicle 110 informs movement of the aerial vehicle 110 itself. Specifically, movement of the set point of the aerial vehicle 110 designates the speed, direction, and trajectory of the aerial vehicle 110.

As previously mentioned, the set point of the aerial vehicle 110 is changed via input to the remote controller 120. The first control panel 150 of remote controller 120 may be used to control "up-down" direction (e.g. lift and landing) of the set point of the aerial vehicle 110. The second control panel 155 may be used to control "forward-reverse" or may control the direction of the set point of the aerial vehicle 110. In alternate embodiments, the control panels 150, 155 are mapped to different directions for the aerial vehicle 110. Each control panel 150, 155 may be structurally configured as a joystick controller and/or touch pad controller. The ignition button 160 may be used to start the rotary assembly (e.g., start the propellers 145). The auto-flight control button 165 may be used to override the controls of the remote controller 120 and transmit instructions to the aerial vehicle 110 to autonomously travel to a predefined location. The ignition button 160 and the auto-flight control button 165 may be mechanical and/or solid state press sensitive buttons.

In addition, each button may be illuminated with one or more light emitting diodes (LEDs) to provide additional details. For example a LED may switch from one visual state to another to indicate with respect to the ignition button 160 whether the aerial vehicle 110 is ready to fly (e.g., lit green) or not (e.g., lit red) or whether the aerial vehicle 110 is now in an auto-flight mode (e.g., lit yellow) or a manual flight mode (e.g., lit red). It also is noted that the remote controller 120 may include other dedicated hardware buttons and switches and those buttons and switches may be solid state buttons and switches. For example, a button or switch may be configured to allow for triggering a signal to the aerial vehicle 110 to immediately execute a landing operation.

The remote controller 120 may also include hardware buttons or other controls that control the gimbal 175 or camera 115. The remote controller 120 may allow it's user to change the preferred orientation of the camera 115. In some embodiments, the preferred orientation of the camera 115 may be set relative to the angle of the aerial vehicle 110. In another embodiment, the preferred orientation of the camera 115 may be set relative to the ground. The remote controller 120 may also transmit commands to the aerial vehicle 110 which are routed to the camera 115 through the gimbal 175 to take a picture, record a video, change a picture or video setting, and the like.

The remote controller 120 also may include a screen 170 which provides for visual display. The screen 170 may be a touch sensitive screen. The screen 170 also may be, for example, a liquid crystal display (LCD), an LED display, an organic LED (OLED) display, or a plasma screen. The screen 170 may allow for display of information related to the remote controller 120, such as menus for configuring the remote controller 120 or remotely configuring the aerial vehicle 110. The screen 170 also may display images or video captured from the camera 115 coupled with the aerial vehicle 110, wherein the images and video are transmitted to the remote controller 120 via the wireless network 125. The video content displayed on the screen 170 may be a live feed of the video or a portion of the video captured by the camera 115. It is noted that the video content may be displayed on the screen 170 within a short time (e.g., within fractions of a second) of being captured by the camera 115. The delay between the video being captured by the camera 115 and being displayed on the screen 170 may be instantaneous or nearly instantaneous in terms of human perceptual quality.

The remote controller 120 shown in FIG. 1 is a dedicated remote controller, but in alternate embodiments the remote controller may be another computing device such as a laptop, smartphone, or tablet that is configured to wirelessly communicate directly through an antenna system with the aerial vehicle 110 to control the aerial vehicle 110.

Figure 2:
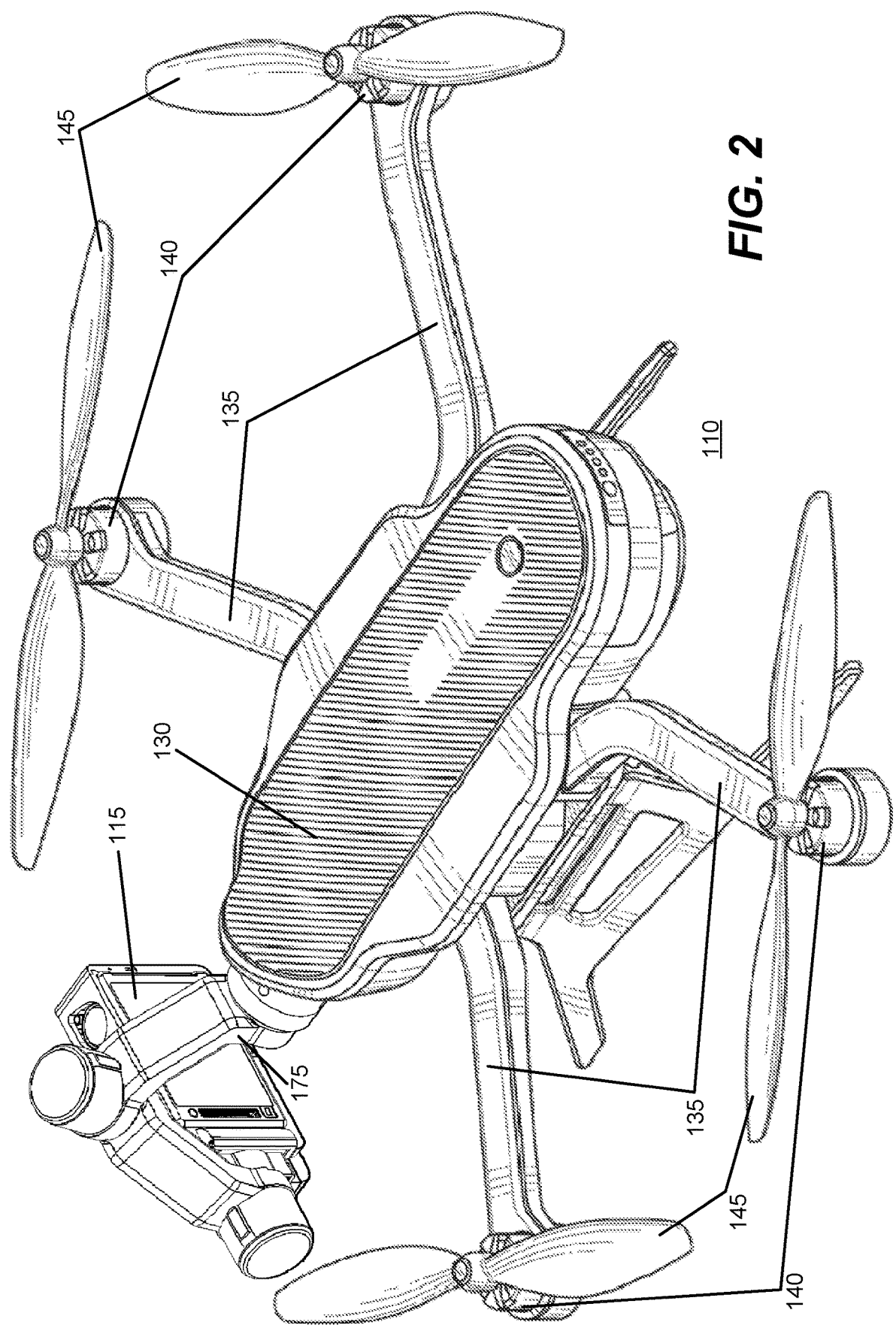
FIG. 2 shows a perspective view of a remote controlled aerial vehicle, according to one or more embodiments.

FIG. 2 illustrates an example of an aerial vehicle 110. The aerial vehicle 110 may be coupled to a camera 115 via a gimbal 175. The camera 115 may capture video and send the video to the aerial vehicle 110 through a bus of the gimbal 175. The aerial vehicle 110 may wirelessly transmit the video to the remote controller 120. The aerial vehicle 110 may include one or more internal antennas in the housing 130 for transmitting signals to and receiving signals from the remote controller 120. The one or more antennas may be omnidirectional. In some embodiments, the antennas of the aerial vehicle 110 radiate the majority of their power beneath the aerial vehicle 110 (e.g., in the semi-sphere beneath the aerial vehicle 110).

Figure 3:
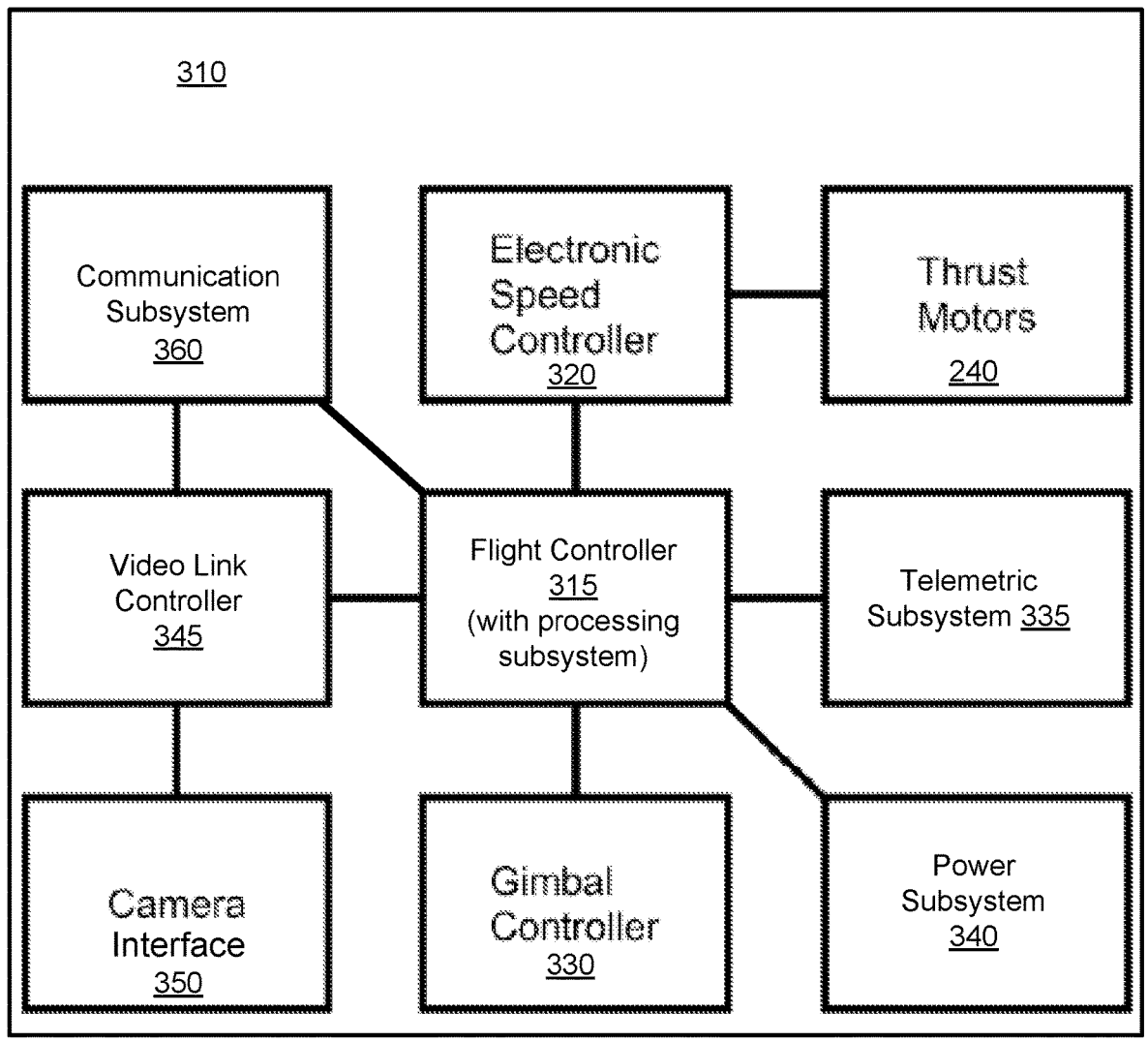
FIG. 3 illustrates a block diagram of an example of a remote controlled aerial vehicle electronics and control system, according to one or more embodiments.

FIG. 3 illustrates an example embodiment of electronics and control (EC) system 310 of the aerial vehicle 110. The EC system 310 may include a flight controller 315, an electronic speed controller 320, one or more thrust motors 240, a gimbal controller 330, a telemetric subsystem 335, a power subsystem 340, a video link controller 345, a camera interface 350, and a long range communication subsystem 360. Each of these components is implemented as hardware, software, firmware, or any combination thereof. The components communicate directly or indirectly with each other through a data bus on the aerial vehicle 110.

In one embodiment, the communication subsystem 360 can be a long range WiFi system. It also can include or be another wireless communication system, for example, one based on long term evolution (LTE), 3G, 4G, or 5G mobile communication standards. The communication subsystem 360 also could be configured with a uni-directional RC channel for communication of controls from the remote controller 120 to the aerial vehicle 110 and a separate unidirectional channel for video downlink from the aerial vehicle 110 to the remote controller 120 (or to a video receiver where direct video connection may be desired). The telemetric (or sensor) subsystem 335 may include navigational components, for example, a gyroscope, accelerometer, a compass, a global positioning system (GPS) and/or a barometric sensor. The power subsystem 340 can include a battery pack and a protection circuit module as well as a power control/battery management system. The camera interface 350 can interface with a camera or may include an integrated camera. The integrated camera may be positioned similar to the camera mount 220 and the camera may incorporate a camera mount.

The flight controller 315 of the EC system 310 may communicate with the remote controller 120 through the communication subsystem 360. The flight controller 315 may control the flight related operations of the aerial vehicle 110 by control over the other components such as the electronic speed controller 320 and the telemetric subsystem 335. The flight controller 315 may interface with the gimbal controller 330 to control the gimbal 175 and the video link controller 345 for camera operation control.

The electronic speed controller 320 may be configured to interface with the thrust motors 240 to control the speed and thrust applied to the rotors 140 via the thrust motors 240 (via electronics interface) of the aerial vehicle 110. The video link controller 345 may be configured to communicate with the camera interface 350 to capture and transmit images from a camera to the remote controller 120 (or other device with screen such as a smart phone), e.g., via the communication subsystem 360. The video may be overlaid and/or augmented with other data from the aerial vehicle 110 such as the telemetric (or sensor) data from the telemetric subsystem 335. The power subsystem 340 is configured to manage and supply power to the components of the EC system 310.

Example Autonomous Radius Tracking

Figure 4:
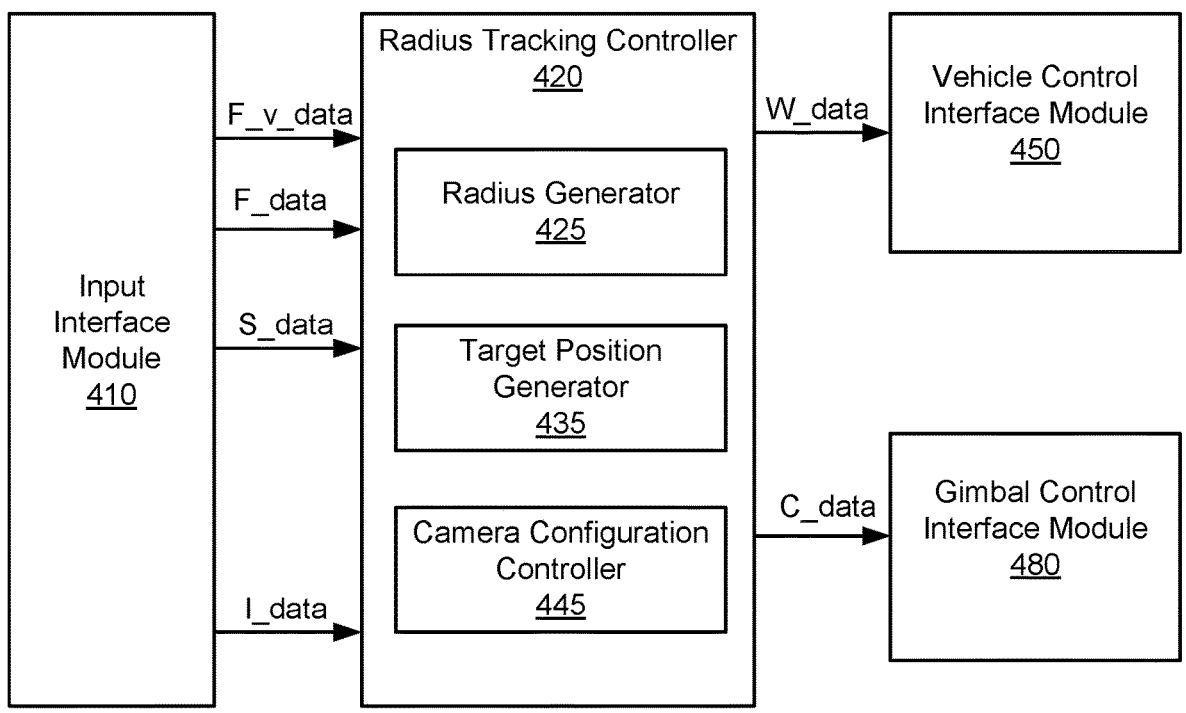
FIG. 4 illustrates an example block diagram of a flight controller of the remote controlled aerial vehicle electronics and control system, according to one or more embodiments.

FIG. 4 illustrates an example block diagram of a flight controller 315, according to one or more example embodiments. In one example embodiment, the flight controller 315 may include an input interface module 410, a radius tracking controller 420, a vehicle control interface module 450, and a gimbal control interface module 480. These components may operate together to autonomously control a movement of the aerial vehicle 110 and change configurations of a camera based on a virtual sphere around the aerial vehicle. These components may be embodied as hardware, software, firmware, or any combination thereof.

The input interface module 410 obtains information used for automatically determining a flight plan including target positions of the aerial vehicle 110. In one example embodiment, the input interface module 410 is communicatively coupled to the communication subsystem 360, the telemetric subsystem 335, and the camera interface 350 of FIG. 3. From the telemetric subsystem 335, the input interface module 410 obtains vehicle position data F_data describing x, y, z coordinates of a measured position F of the aerial vehicle 110, and a velocity data F_v_data describing a velocity F_v of the aerial vehicle 110. The measured position F of the aerial vehicle 110 may be a current position of the aerial vehicle 110 and the velocity F_V may be a current velocity of the aerial vehicle 110 measured by the telemetric subsystem 335. From the communication subsystem 360, the input interface module 410 obtains subject position data S_data describing x, y, z coordinates of a subject position S, based on a wireless signal describing the position of the subject. Such wireless signal may be transmitted by the subject or by another system monitoring the subject. Alternatively, the input interface module 410 may be coupled to a subject position estimation subsystem (not shown) that estimates the subject position S. The subject position estimation subsystem analyzes a combination of an image of the subject captured by the camera and time of light (e.g., infrared) measured by a ranging sensor attached to the aerial vehicle 110 and estimates the subject position with respect to the aerial vehicle 110 in three dimensional space. Moreover, the subject position estimation subsystem generates the subject position data S_data based on the estimated position of the subject. From the camera interface 350, the input interface module 410 receives camera configuration data I_data describing current camera configurations I (e.g., pitch, heading, field of view, frame rate, resolution, sensitivity to light according to ISO, white balance, aperture, exposure, etc.). The input interface module 410 provides the velocity data F_v_data, the position data F_data, the subject position data S_data, the camera configuration data I_data to the radius tracking controller 420.

The radius tracking controller 420 may receive data (e.g., F_v_data, F_data, S_data, I_data) from the input interface module 410 and may determine an updated target position W of the aerial vehicle 110 and updated configurations C of the camera. In one embodiment, the radius tracking controller 420 may generate a virtual sphere, in which the aerial vehicle 110 is located on a center of the virtual sphere, according to the input data from the interface module 410. In addition, the radius tracking controller 420 may generate an updated target position data W_data describing the updated target position W of the aerial vehicle 110 and updated camera configuration data C_data describing updated configurations C of the camera, according to the virtual sphere. Detailed description of the radius tracking controller 420 is provided below with respect to FIGS. 5 through 8.

The vehicle control interface module 450 may receive the updated target position data W_data from the radius tracking controller 420. The vehicle control interface module 450 may configure the electronic speed controller 320 and the thrust motors 240 to move the aerial vehicle 110 towards the updated target position W as indicated by the updated target position data W_data. The vehicle control interface module 450 may determine a direction and a speed (or acceleration) of the aerial vehicle 110 to travel towards the updated target position W based on the updated target position data W_data, and configure the electronic speed controller 320 and the thrust motors 240 according to the determined direction and the speed (or acceleration) of the aerial vehicle 110. Hence, the aerial vehicle 110 travels towards the updated target position W.

The gimbal control interface module 480 may receive the updated camera configuration data C_data from the radius tracking controller 420, and configures the gimbal controller 330 accordingly. In one aspect, the updated camera configuration data C_data describes a desired pitch and heading of the camera. The gimbal control interface module 480 may determine a corresponding orientation of the gimbal 175, and may configure the gimbal 175 according to the corresponding orientation such that the camera faces in the pitch and heading as indicated by the updated camera configuration data C_data.

In one example embodiment, the radius tracking controller 420 may include a radius generator 425, a target position generator 435, and a camera configuration controller 445. These components may operate together to dynamically generate a virtual sphere around the aerial vehicle 110, and generate the updated target position data W_data and the updated camera configuration data C_data, according to the virtual sphere. These components of the radius tracking controller 420 may be embodied as hardware, software, firmware, or any combination thereof.

The radius generator 425 dynamically generates a virtual sphere surrounding the aerial vehicle 110. The aerial vehicle 110 is located on a center of the virtual sphere with a radius r. The radius r may be dynamically determined based on the velocity data F_v and the camera configuration data I_data, as described in the following equation:

$$r = r_{min} + (r_{max} - r_{min})\frac{F\_v}{F\_v_{max}} f(I) \qquad \text{Eq. (1)}$$

where $r_{min}$ is a minimum radius of the virtual sphere; $r_{max}$ is a maximum radius of the virtual sphere; $F\_v_{max}$ is a maximum velocity of the aerial vehicle; and f(I) is an adjustment factor based on the camera parameters I. In one aspect, the radius r is proportional to the velocity of the vehicle and a frame rate of the camera.

In one aspect, adjust factor f(I) is based on camera parameters I. The adjustment factor f(I) outputs a normalized number between 0.0 and 1.0, according to camera parameters I. In one example, for a larger field of view, a radius r becomes smaller to allow the aerial vehicle 110 to be closer to the subject while keeping the subject in frame. In one example, for a lower resolution, a lower frame rate, or both, the radius r becomes smaller to allow the aerial vehicle 110 to be closer to the subject. For low light, longer exposure, and/or higher sensitivity of light (e.g., high ISO), the radius r becomes larger to smooth out the movement of the aerial vehicle 110. According to the adjustment factor f(I), capture image of the subject can be optimized in a cinematically pleasing manner at a cost of degraded tracking performance. In one example, the adjustment factor f(I) can be obtained according to the following equation:

$$f(I) = FSF\left(\frac{I_{FOV}}{FOV_{MAX} - FOV_{MIN}}\right) + ISF\left(\frac{I_{ISO}}{ISO_{MAX} - ISO_{MIN}}\right) \qquad \text{Eq. (2)}$$

where FSF is a scale factor for field of view (FOV); $I_{FOV}$ is an input FOV of the camera parameters I; $FOV_{MAX}$ is a maximum FOV of the camera; $FOV_{MIN}$ is a minimum FOV of the camera; ISF is a scale factor for sensitivity of light in ISO; $I_{ISO}$ is an input ISO of the camera parameters I; $ISO_{MAX}$ is a maximum ISO of the camera; $ISO_{MIN}$ is a minimum ISO of the camera.

The target position generator 435 may determine an updated target position W of the aerial vehicle 110 based on the radius r determined by the radius generator 425. In one aspect, the target position generator 435 operates in at least two states according to previous target position W_L of the aerial vehicle 110 and the virtual sphere. For example, if the previous target position W_L is located outside of the virtual sphere, the target position generator 435 operates in an out-state to determine the updated target position W of the aerial vehicle 110 based on the previous target position W_L. If the previous target position W_L is located within the virtual sphere, the target position generator 435 operates in an in-state to determine the updated target position W of the aerial vehicle based on the virtual sphere, the previous target position W_L and the subject position S. Additional description of operations of the target position generator 435 in different states is provided below with respect to FIGS. 5-8.

The camera configuration controller 445 may determine configurations of the camera based on the updated target position data W_data and the subject position data S_data. In one aspect, the camera configuration controller 445 determines an anticipated flight path of the subject based on the subject position S or a previous trajectory of the subject. Moreover, the camera configuration controller 445 may determine the pitch and heading of the camera according to a flight path of the aerial vehicle 110 towards the updated target position W and an anticipated position of the subject. In particular, the camera configuration controller may determine the pitch and heading of the camera to face the subject while the aerial vehicle 110 travels towards the updated target position W. Accordingly, images of the moving subject can be captured, while the aerial vehicle 110 travels towards the updated target position W.

Figure 5:
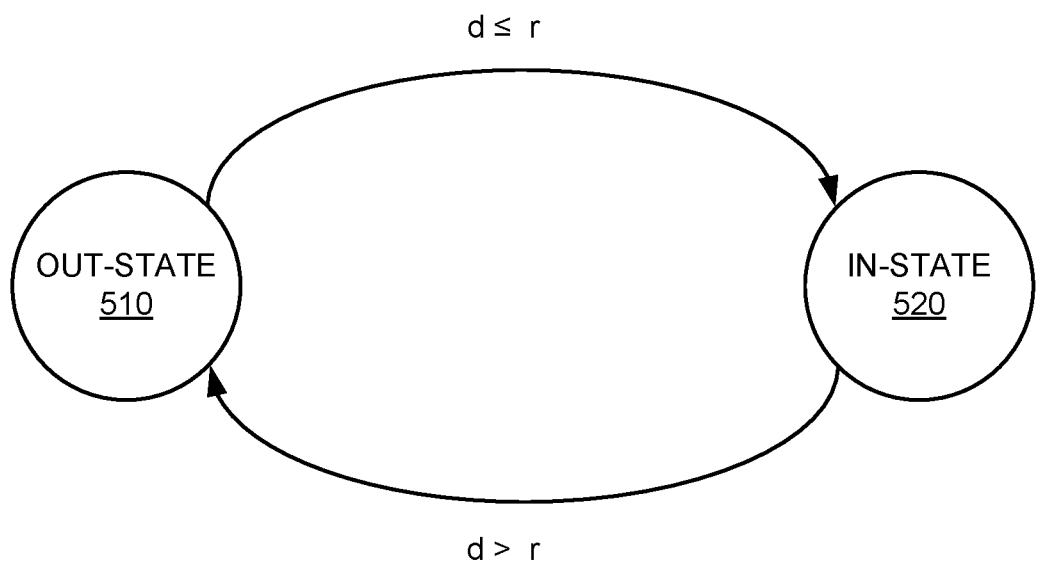
FIG. 5 illustrates a state transition diagram of a target position generator of the flight controller, according to one or more embodiments.

Referring now to FIG. 5, it illustrates a state transition diagram of the target position generator 435, according to one or more example embodiments. The target position generator 435 may determine whether the previous target position W_L is within the virtual sphere or outside of the virtual sphere, and operates in a state corresponding to the determination. In one aspect, the target position generator 435 obtains a distance d between a measured position F (e.g., current position) of the aerial vehicle 110 and the previous target position W_L of the aerial vehicle 110 and compares the distance d with the radius r of the virtual sphere to determine whether the previous target position W_L is within or outside of the virtual sphere. If the distance d is less than the radius r, the target position generator 435 may determine that the previous target position W_L is within the virtual sphere and operates in an in-state. If the distance d is larger than the radius r, the target position generator 435 may determine that the previous target position W_L is outside of the virtual sphere and operates in an out-state.

Figure 6A:
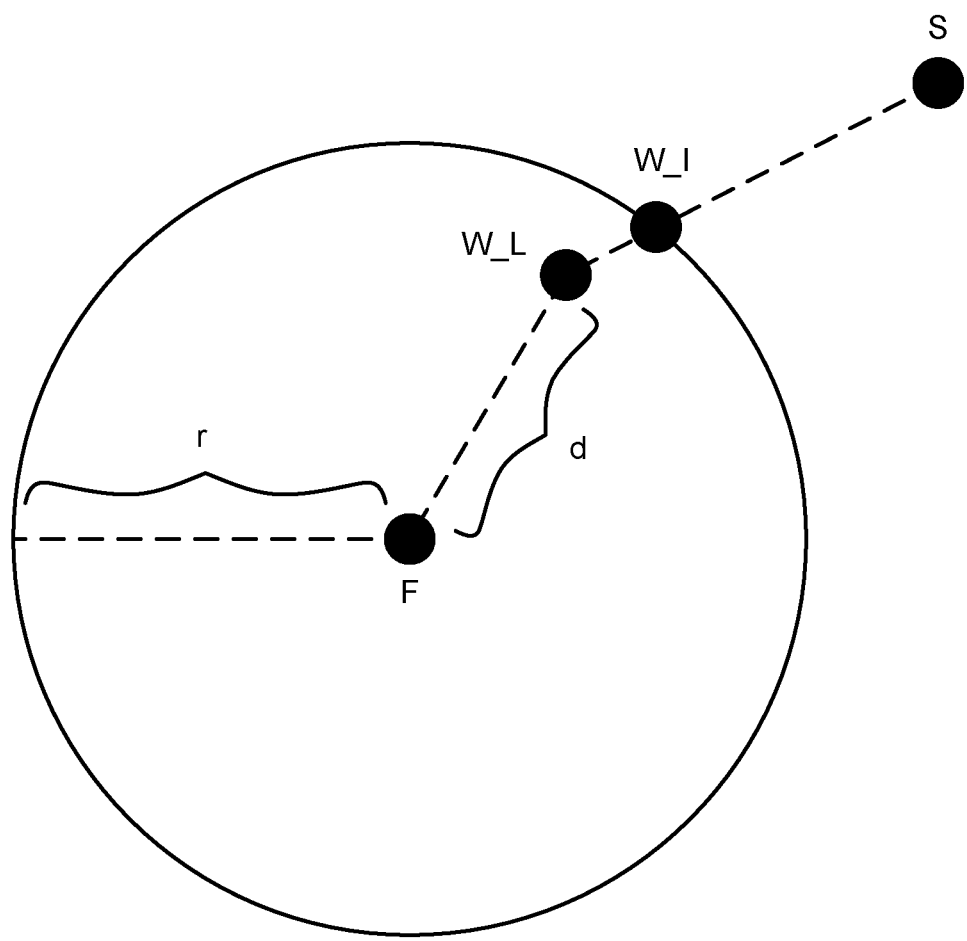
FIGS. 6A and 6B illustrate example arrangements of a previous target position and a virtual sphere.
Figure 6B:
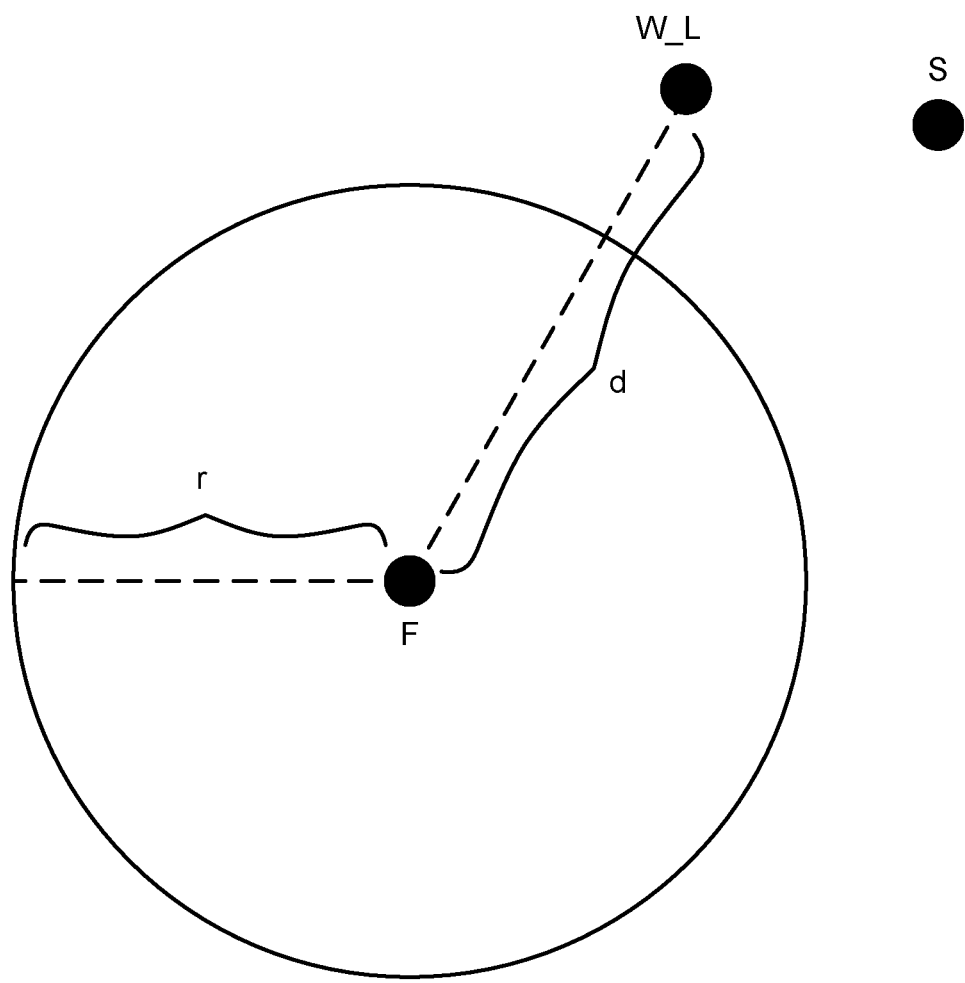

FIGS. 6A and 6B illustrate example arrangements of a previous target position W_L and a virtual sphere. Specifically, FIG. 6A illustrates an example arrangement of the previous target position W_L located within the virtual sphere, where the target position generator 435 operates in the in-state. FIG. 6B illustrates an example arrangement of the previous target position W_L located outside of the virtual sphere, where the target position generator 435 operates in the out-state.

Turning back to FIG. 6A, the target position generator 435 may operate in the in-state. In the example in FIG. 6A, the distance d between the previous target position W_L and the measured position F of the aerial vehicle 110 is less than the radius r of the virtual sphere. Hence, the target position generator 435 may determine that the previous target position W_L is within the virtual sphere, and operates in the in-state. In the in-state, the target position generator 435 may determine the updated target position W to direct the aerial vehicle 110 towards the subject along a smooth trajectory. For example, the target position generator 435 determines the updated target position W to be an intersection W_I between (i) a direct path the previous target position W_L and the subject position S and (ii) a surface of the virtual sphere. An example algorithm of identifying the intersection W_I is provided below in table 1.

Table 1 shows one example approach of identifying the intersection W_I in the in-state.

| Algorithm |
| --- |
| /* distance in x y */<br>diff_x = W_x − W_Lx;<br>diff_y = W_y − W_Ly;<br>a = (diff_x * diff_x) + (diff_y * diff_y);<br>b2 = ((-W_Lx * diff_x) + (-W_Ly * diff_y));<br>c = (W_Lx * W_Lx) + (W_Ly * W_Ly) - (r^2);<br>pby2 = b2 / a;<br>q = c / a;<br>delta = pby2 * pby2 - q;<br>dsqr = sqrt(delta);<br>u1 = -pby2 + dsqr;<br>u2 = -pby2 - dsqr;<br>ix0 = W_Lx - diff_x *u1;<br>iy0 = wp_y0 - diff_y * u1;<br>ix1 = W_Lx - diff_x * u2;<br>iy1 = W_Ly - diffy * u2;<br>if (W_Lx <= ix0 && ix0 <= W_x)<br>{<br>  ix = ix0;<br>  iy = iy0;<br>}<br>else<br>{<br>  ix = ix1;<br>  iy = iy1;<br>}<br>// W_x is x-coordinate of S with respect to F.<br>// W_y is y-coordinate of S with respect to F.<br>// W_Lx is x-coordinate of W_L with respect to F<br>// W_Ly is y-coordinate of W_L with respect to F<br>// ix is x-coordinate of W_I with respect to F<br>// iy is y-coordinate of W_I with respect to F |

In one or more example embodiments, the target position generator 435 may further determine the updated target position based on environmental condition data (e.g., wind speed and direction), terrain condition data (e.g., locations of tall dense shrubs), and other information necessary for planning a flight of the aerial vehicle.

Referring to FIG. 6B, the target position generator 435 may operate in the out-state. In the example in FIG. 6B, the distance d between the previous target position W_L and the measured position F of the aerial vehicle 110 is larger than the radius r of the virtual sphere. Hence, the target position generator 435 determines that the previous target position W_L is outside of the virtual sphere, and operates in the out-state. In the out-state, the target position generator 435 may determine the previous target position W_L to be the updated target position W (i.e., maintains the previous target position W_L), such that the aerial vehicle 110 continues to travel towards the previous target position W_L.

Figure 7:
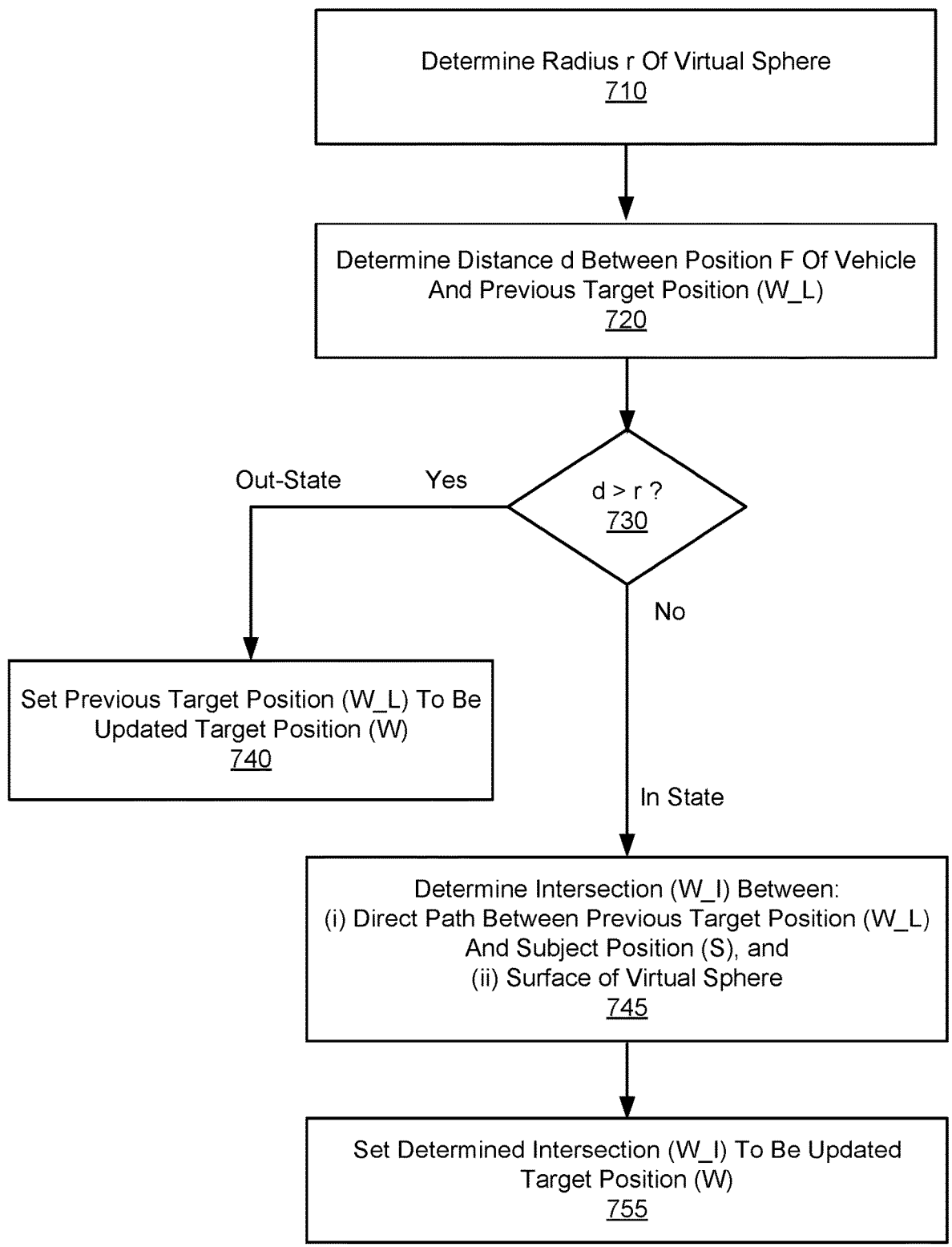
FIG. 7 illustrates a flow diagram for autonomously determining a future destination of an aerial vehicle to track a subject based on a dynamic radius, according to one or more embodiments.

FIG. 7 illustrates a flow diagram for autonomously determining a future destination of the aerial vehicle 110 to track a subject based on a dynamic radius, according to one or more embodiments. The steps in FIG. 7 may be performed by, for example, the radius tracking controller 420 of FIG. 4. In some example embodiments, some or all of the steps in FIG. 7 may be performed by other entities (e.g., remote controller or other computing system). In addition, some example embodiments may perform the steps in parallel, perform the steps in different orders, or perform different, fewer, or additional steps.

The radius tracking controller 420 may determine 710 the radius r of a virtual sphere, in which the aerial vehicle 110 is located on a center of the virtual sphere. The radius r may be dynamically determined based on the velocity $F\_v$ of the aerial vehicle, the camera configurations I (e.g., pitch, heading, frame rate, etc.) or a combination of them.

The radius tracking controller 420 may determine 720 a distance d between a measured position F of the aerial vehicle 110 and a previous target position $W\_L$. The previous target position $W\_L$ is a previously determined target position of the aerial vehicle 110 as part of a flight plan, and may be cached by the radius tracking controller 420. Because the aerial vehicle 110 is located on the center of the virtual sphere, the distance d between the measured position F of the aerial vehicle 110 and the previous target position $W\_L$ is also a distance between the center of the virtual sphere and the previous target position $W\_L$.

The radius tracking controller 420 compares 730 the distance d and the radius r to determine whether the previous target position $W\_L$ of the aerial vehicle 110 is within the virtual sphere or not. Moreover, the radius tracking controller 420 determines a state of operation for determining an updated target position W of the aerial vehicle 110 based on the determination of the location of the previous target position $W\_L$ with respect to the virtual sphere.

Responsive to determining that the distance d is larger than the radius r, the radius tracking controller 420 operates in the out-state. In the out-state, the radius tracking controller 420 sets 740 the previous target position $W\_L$ to be the updated target position W. Hence, the aerial vehicle 110 continues to travel towards the previous target position $W\_L$.

Responsive to determining that the distance d is less than the radius r, the radius tracking controller 420 operates in the in-state. In the in-state, the radius tracking controller 420 determines 745 an intersection $W\_I$ between (i) a direct path between the previous target position $W\_L$ and the subject position S and (ii) a surface of the virtual sphere. In addition, the radius tracking controller 420 sets 755 the determined intersection $W\_I$ to be the updated target position W.

Figure 8:
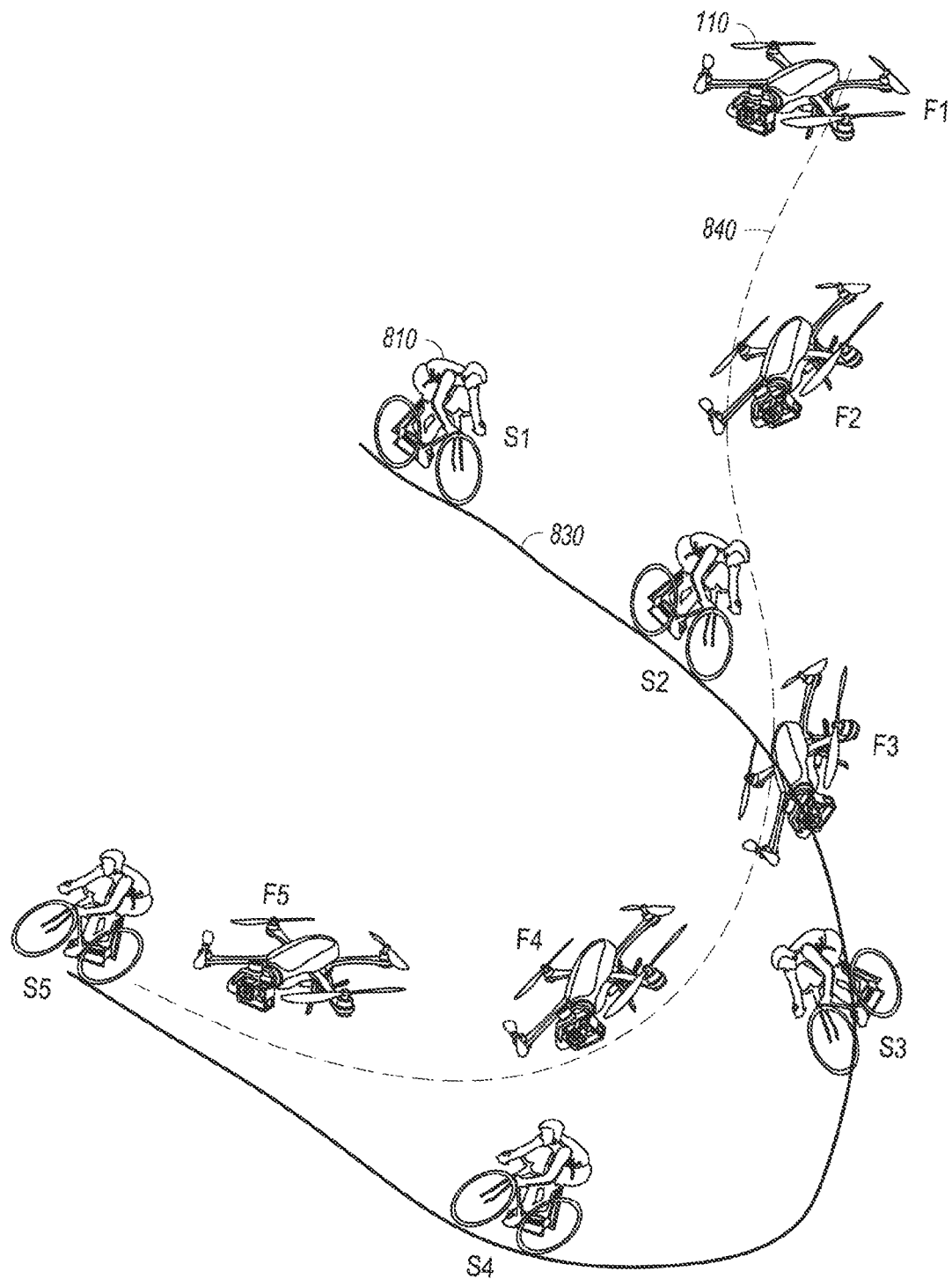
FIG. 8 illustrates example trajectories of a subject and the aerial vehicle following the subject based on a dynamic radius, according to one or more embodiments.

FIG. 8 illustrates example trajectories of a subject 810 and an aerial vehicle 110 following the subject based on a dynamic radius, according to one or more embodiments. The aerial vehicle 110 may be the aerial vehicle 110 of FIG. 1. In FIG. 8, the subject 810 (e.g., a person riding a motorbike) making a sharp turn travels along a trajectory 830 to pass positions S1, S2 . . . S6 in that sequence. Meanwhile, the aerial vehicle 110 follows the subject 810 along a smooth trajectory 840 to pass positions F1, F2 . . . F7 in that sequence. Because the aerial vehicle 110 continues to travel towards the previous target position $W\_L$ in the out-state until the previous target position $W\_L$ is within the virtual sphere in the in-state, a response of the aerial vehicle 110 to a quick movement of the subject 810 may be delayed. Such delay allows the aerial vehicle 110 to travel along the smoother trajectory 840 than the sharp trajectory 830, and captures images of abrupt movements of the subject 810 in a cinematically pleasing manner.

Example Machine Architecture

Figure 9:
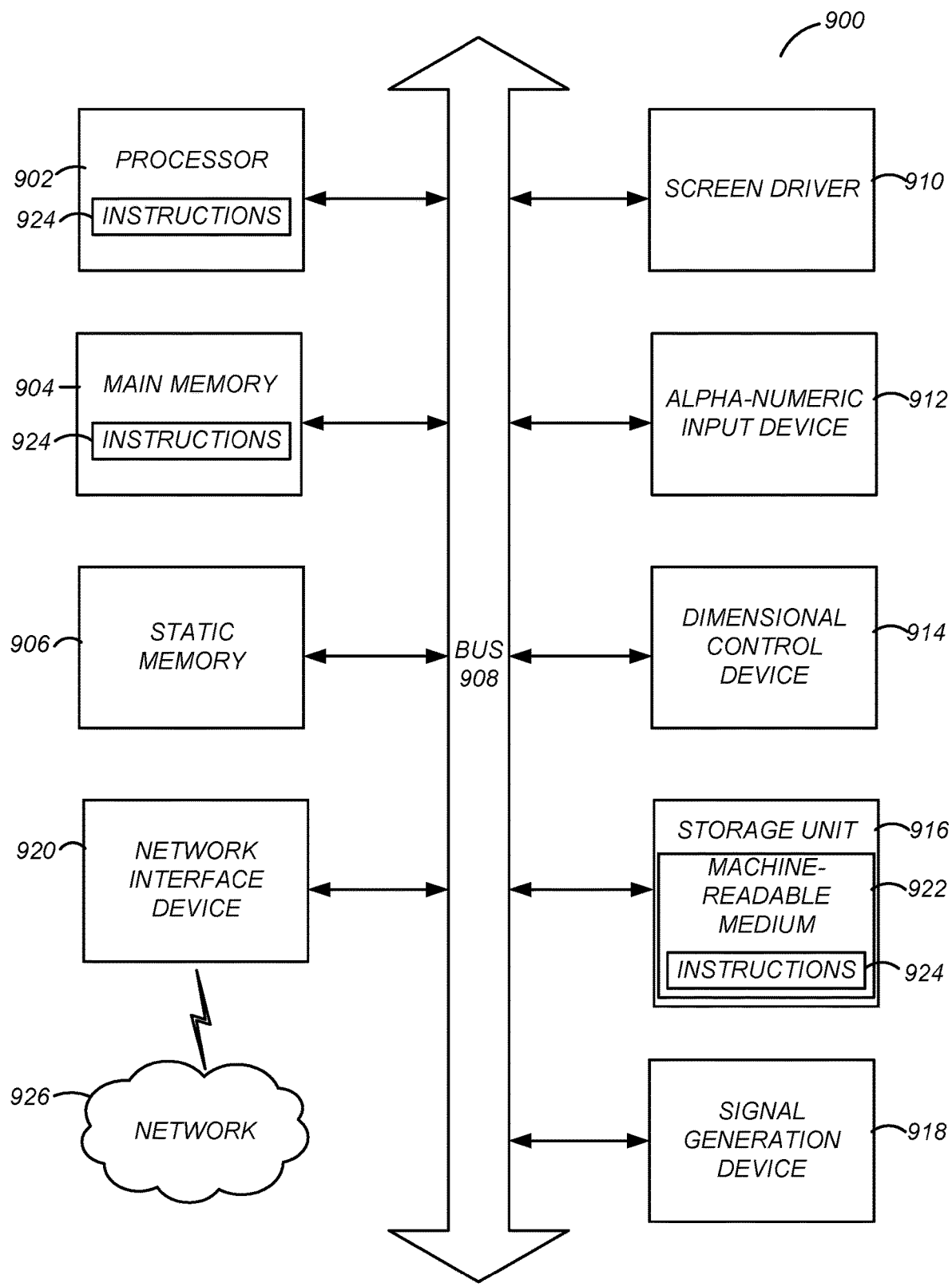
FIG. 9 illustrates an example computing machine.

As has been noted, the remote controlled aerial vehicle 110 can be remotely controlled from the remote controller 120. The aerial vehicle 110 and the remote controller 120 are machines that may be configured operated using software. FIG. 9 is a block diagram illustrating components of an example machine able to read instructions from a machine-readable medium and execute them in one or more processors (or controllers). All or portions of the example machine described in FIG. 9 may be present and/or used with the aerial vehicle 110 and/or the remote controller 120 and/or other parts of a system that interfaces with the aerial vehicle 110 and/or remote controller 120.

In FIG. 9 there is a diagrammatic representation of a machine in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example is a handheld controller to control the remote controlled aerial vehicle, e.g., 110. However, the architecture described may be applicable to other computer systems that operate in the system of the remote controlled aerial vehicle, e.g., 110, with camera and mounting configuration, e.g., in setting up a local positioning system. These other example computer systems include a server computer, a client computer, a personal computer (PC), a tablet PC, a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904 and the storage unit 916 communicate via a bus 908.

The computer system 900 may include a static memory 906, a screen driver 910 (e.g., to drive a screen, e.g., 170, such as plasma display panel (PDP), a liquid crystal display (LCD), or a projector). The computer system 900 may also include input/output devices, e.g., an alphanumeric input device 912 (e.g., a keyboard), a dimensional (e.g., 2-D or 3-D) control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed configuration beneficially allows an aerial vehicle, e.g., 110, to autonomously follow a moving subject based on a virtual sphere surrounding the aerial vehicle. By adjusting a target position of the aerial vehicle 110 based on the previous determined target position with respect to the virtual sphere, the aerial vehicle 110 can respond to sudden or unanticipated movements of a subject by moving following a smooth trajectory. Moreover, the camera coupled to the aerial vehicle can face the moving subject while traveling along the smooth path to capture images of such abrupt movements of the subject.

The disclosed configurations also can be applied to other types of aerial vehicles or unmanned ground vehicles.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described within FIGS. 3-9. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 902, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of the "a" or "an" may be employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for autonomously following a subject based on a radius of a virtual sphere through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A vehicle comprising:
    a camera;
    a controller configured to:
        determine a virtual space around the vehicle based on the camera, and
        determine a target position of the vehicle based on the virtual space;
    a vehicle controller interface configured to move the vehicle towards the target position;
    a target position generator configured to determine an updated target position and the target position and to determine an intersection between the updated target position and the target position; and
    a radius tracking controller configured to determine a second intersection between a direction path relative to the target position, a subject position, and a surface of the virtual space.

2. The vehicle of claim 1, further comprising:
    a gimbal movably coupled to a housing of the vehicle so that the gimbal is capable of moving the camera relative to the vehicle.

3. The vehicle of claim 1, further comprising:
    thrust motors configured to move the vehicle; and
    an electronic speed controller that interfaces with the thrust motors to control a speed of the vehicle.

4. The vehicle of claim 3, wherein the electronic speed controller controls the thrust motors so that the vehicle is moved towards the target position.

5. The vehicle of claim 3, further comprising:
    a vehicle control interface module that is configured to determine a direction and a speed of the vehicle as the vehicle travels towards the target position.

6. A method comprising:
    determining, with a controller, a virtual space around an unmanned aerial vehicle based on data from a camera;
    determining, with the controller, a target position of the unmanned aerial vehicle based on the virtual space;
    moving the unmanned aerial vehicle, with a vehicle controller interface, towards the target position;
    generating a flight plan to the target position;
    generate the target position, with a target position generator, to determine an updated target position; and
    determine an intersection between the target position, a subject position, and a surface of the virtual space.

7. The method of claim 6, further comprising:
    generating way points or additional target positions enroute to the target position.

8. The method of claim 6, further comprising:
    changing a speed of the unmanned aerial vehicle, with an electronic speed controller, by changing an amount of thrust applied by thrust motors.

9. The method of claim 8, further comprising:
    controlling the thrust motors to move the unmanned aerial vehicle towards the target position.

10. The method of claim 8, further comprising:
    determining a direction and the speed of the unmanned aerial vehicle, with a vehicle control interface module, as the unmanned aerial vehicle travels towards the target position.

11. A non-transitory computer-readable storage medium including executable instructions that, when executed by a processor, facilitate performance of operations comprising operations to:
    determine, with a controller, a virtual space around an unmanned aerial vehicle based on data from a camera;
    determine, with the controller, a target position of the unmanned aerial vehicle based on the virtual space;
    move the unmanned aerial vehicle, with a vehicle controller interface, towards the target position;
    generate a flight plan to the target position;
    generate the target position, with a target position generator, to determine an updated target position; and
    determine an intersection between the target position, a subject position, and a surface of the virtual space.

12. The non-transitory computer-readable storage medium of claim 11, wherein the operations further comprise operations to:
  generate waypoints or additional target positions between a current position of the unmanned aerial vehicle and the target position.

13. The non-transitory computer-readable storage medium of claim 12, wherein the operations further comprise operations to:
  change a speed of the unmanned aerial vehicle, with an electronic speed controller, via a change in thrust applied by thrust motors.

14. The non-transitory computer-readable storage medium of claim 11, wherein the operations further comprise operations to:
  determine a direction and a speed of the unmanned aerial vehicle, with a vehicle control interface module, as the unmanned aerial vehicle travels towards the target position.

15. The non-transitory computer-readable storage medium of claim 14, wherein the operations further comprise operations to:
  determine an intersection between the target position, a subject position, and a surface of the virtual space.

16. The non-transitory computer-readable storage medium of claim 14, wherein the operations further comprise operations to:
  determine a radius of a sphere of the virtual space.

17. The vehicle of claim 1, further comprising:
  a camera configuration controller configured to determine a configuration of the camera based on the updated target position.

18. The vehicle of claim 1, wherein the vehicle operates in an out-state when the target position generator determines the vehicle is outside of the virtual space around the vehicle.

19. The method of claim 6, further comprising:
  updating the target position, to an updated target position, based upon an intersection between a direct path to the target position and a subject position or a surface of the virtual space.

20. The method of claim 6, further comprising:
  anticipating a flight path of the subject based on a subject position or a previous trajectory.

* * * * *